Sept. 8, 1931. L. A. CADORET 1,822,476
AIRCRAFT
Filed May 12, 1930 3 Sheets-Sheet 2
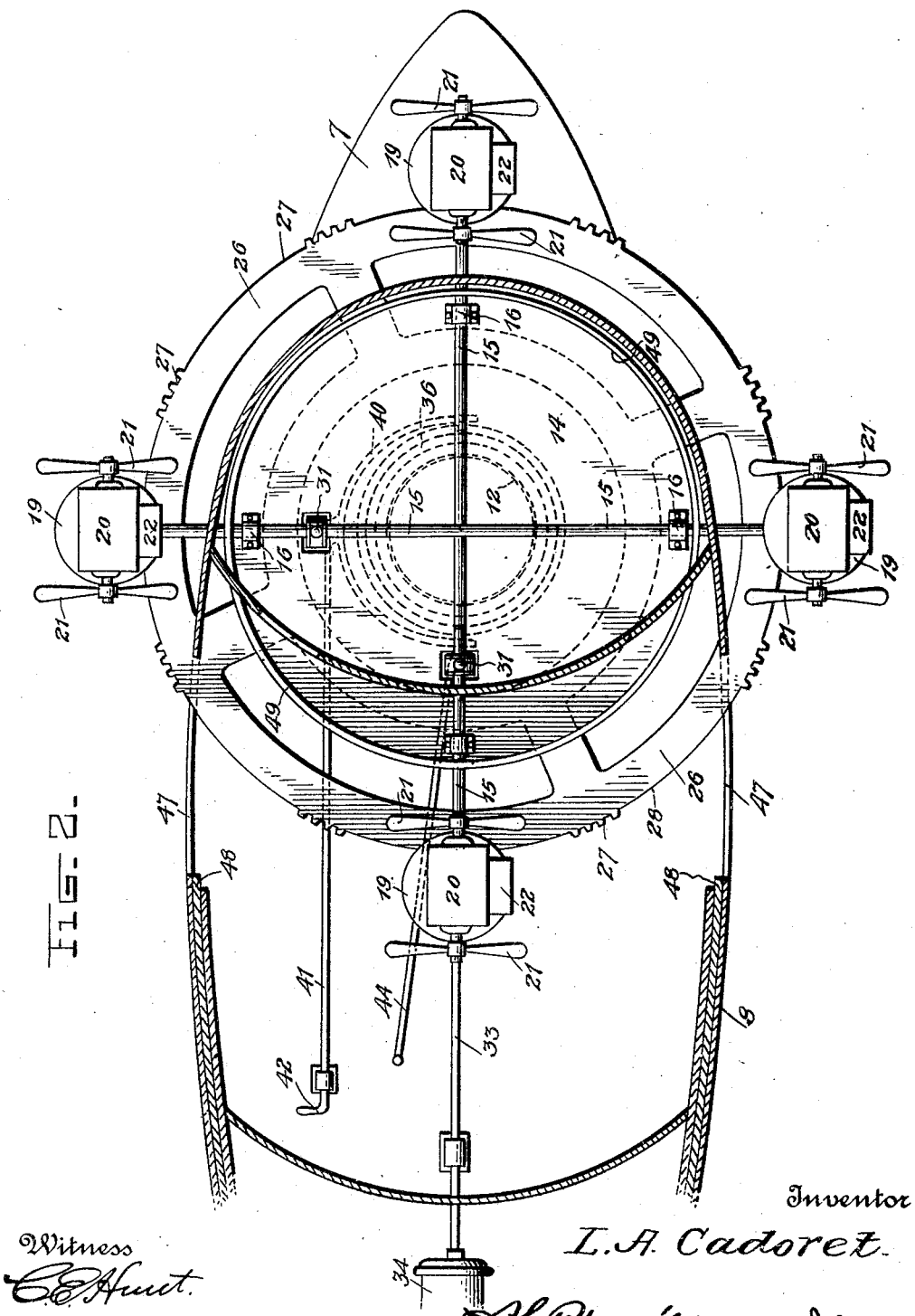

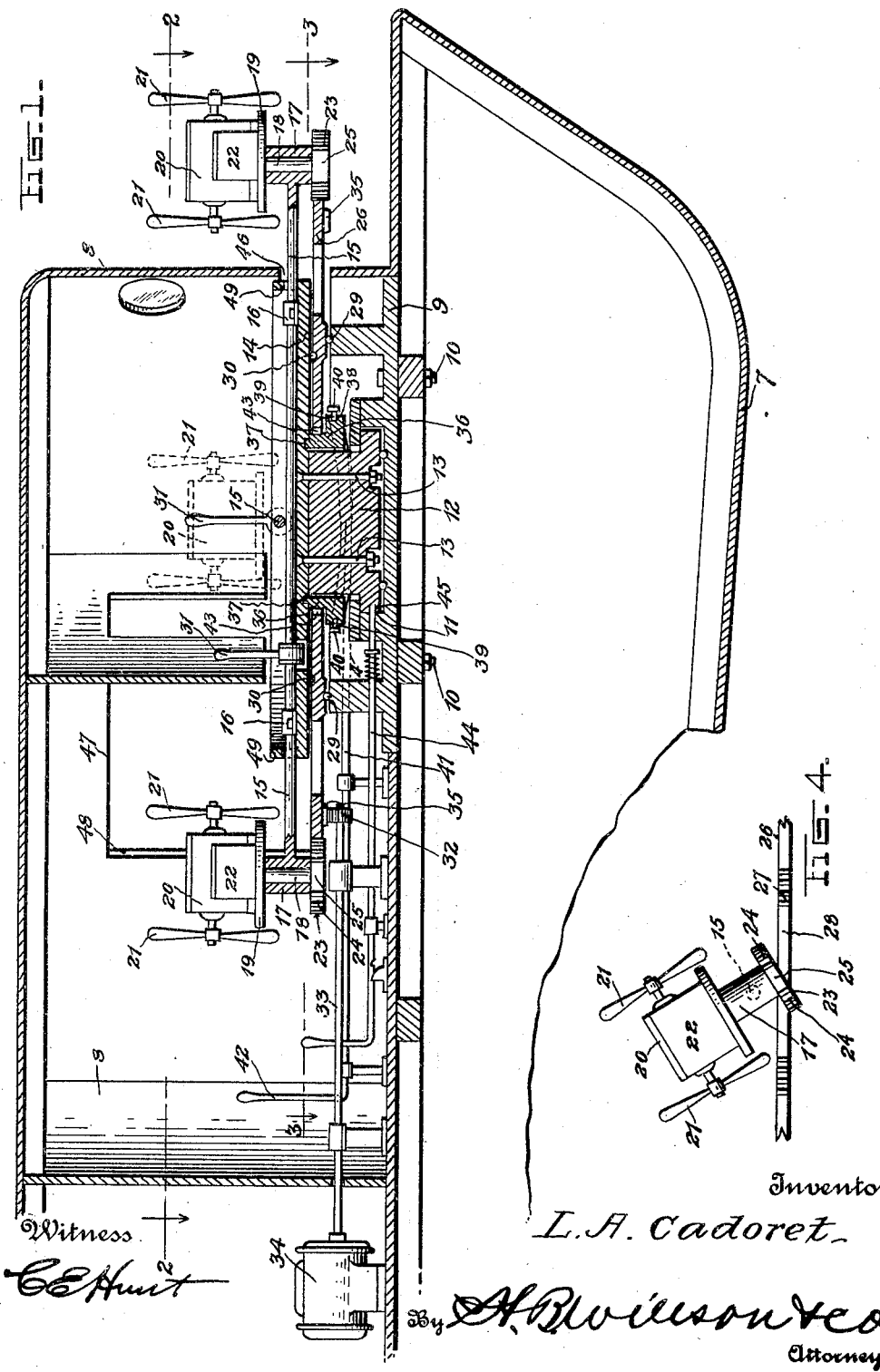

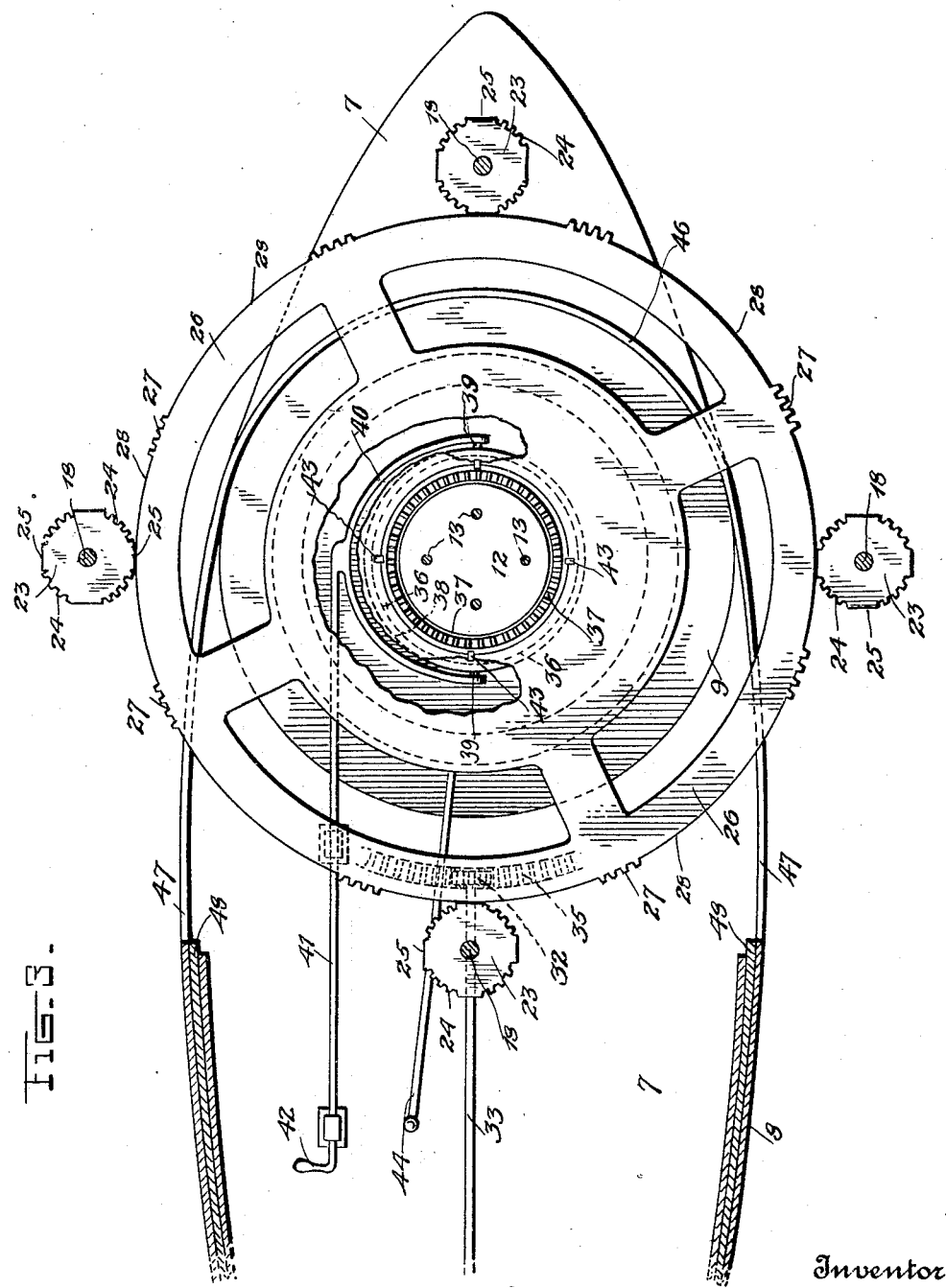

Patented Sept. 8, 1931

1,822,476

UNITED STATES PATENT OFFICE

LOUIS ALEXANDRE CADORET, OF PAWTUCKET, RHODE ISLAND

AIRCRAFT

Application filed May 12, 1930. Serial No. 451,674.

This application is a continuation in part of my prior U. S. application Serial No. 427,807, filed February 12, 1930, and allowed May 11, 1931. Both said prior application and the present application relate to aircraft in general, whether of a lighter than air or a heavier than air type, and the invention aims to provide a craft particularly adapted for long continuous flights. When making such flights, motor failure is often a severe handicap and equally often disastrous, and aircraft of today have no adequate provision allowing the motors to receive proper attention while in flight and hence averting motor trouble. Moreover, in case of one or more motors being disabled, there is no adequate provision for allowing them to be reconditioned and hence the craft must proceed, if at all, with diminished power.

My invention aims to overcome such difficulties as those above stated, by making novel provision whereby some of the motors are idle and at the interior of a windshield in position to receive attention, while the others are at the exterior of said windshield and operating, and whereby one or more of the previously idle motors may be interchanged at will with one or more of those which have been operating, thereby disposing the latter in position to receive any necessary attention, such as lubrication or oil changing, adjustment, spark plug cleaning, valve grinding, etc. Hence, all of the motors may in a great majority of cases be kept in efficient condition, and moreover, if any should require repairs, such repairs may be made under convenient circumstances while the ship is in flight.

A still further object of the invention is to provide means for moving a previously operating motor from the exterior of the windshield to the interior thereof, for simultaneously moving a previously idle motor from the interior of said windshield to its exterior, and for spotting each motor at the position previously occupied by the other.

In the preferred construction, the motors are mounted on a turntable extending partly to the interior and partly to the exterior of the windshield and hence turning of said turntable one-half revolution, will effect the above explained interchange and spotting of motors. Turning of the turntable less than one-half revolution, necessarily moves the motors so that the propellers operate in planes oblique to the length of the craft, and it is a further aim to provide novel means whereby said motors and propellers may be restored to positions in which the propellers operate in planes at right angles to the length of the ship. This same provision however, may be utilized for setting the propellers in oblique planes if it is necessary to combat port or starboard winds.

Yet another object is to make novel provision allowing the propeller-carrying motors to be tilted to assist in ascending or descending whenever desired.

With the foregoing in view, the invention resides in the novel subject matter hereinafter described and claimed, description being accomplished by reference to the accompanying drawings.

Fig. 1 is a vertical longitudinal sectional view through the front portion of an aircraft embodying my invention.

Figs. 2 and 3 are horizontal sectional views on the correspondingly numbered lines of Fig. 1.

Fig. 4 is a detail elevation illustrating the manner in which the propeller-carrying motors may be tilted.

In the present disclosure, the invention is shown in connection with an aircraft which embodies a hull 7 and a cabin 8, and while the invention is shown at the front end of this cabin, it will be understood that it may be used at any desired location or locations. The front wall of the cabin 8, constitutes the windshield hereinbefore mentioned, but a suitable shield could of course be provided in any other adequate way.

A base 9 is secured by bolts or the like 10 to the deck frame of the hull 7, said plate being provided with a bearing socket 11 in which a vertical-axis trunnion 12 is rotatably mounted in any preferred manner. Secured upon this trunnion by bolts or the like 13, is a turntable 14 mounted within the front portion of the cabin 8. Any desired number of shafts 15 extend diametrically of the turntable 14 and are rockably mounted in appropriate bearings 16 carried by said turntable. The outer ends of these shafts 15 are provided with bearings 17 whose axes are normally disposed vertically. Rotatably mounted in these bearings 17 are short vertical shafts 18 whose upper ends are provided with supports 19 upon which motors 20 are mounted, said motors being provided with appropriate propellers 21. Individual gas tanks 22 are shown for the various motors and any desired provision may be made for controlling the feeding of fuel to said motors and for also controlling the ignition circuits thereof. The lower ends of the shafts 18 are provided with pinions 23 having alternate toothed portions 24 and tooth-free portions 25.

Co-operable with the pinions 23 is a large gear 26 which is mounted co-axially with the turntable 14, said gear being provided with alternate toothed portions 27 and tooth-free portions 28 which are cooperable with the corresponding portions of the pinions 23. In the present showing, appropriate bearing means 29 (Fig. 1) support the gear 26 in concentric relation with the turntable 14, and additional bearing means 30 are interposed between said gear and turntable. Provision is made for rotating the gear 26 and I also provide means for connecting this gear with the turntable 14. Then too, I provide means for locking the turntable against rotation whenever desired. When the gear 26 and turntable are connected with each other, driving of said gear will also drive said turntable, thereby moving all of the motors 20 about a circular path, but when the turntable is held against rotation, the gear 26 is disconnected from said turntable, and this gear driven, its teeth will co-operate with the teeth of the pinions 23 to turn the motors 20 upon the shafts 18 as pivots. Then too, suitable provision 31 is made for turning the shafts 15, and when the tooth-free portions 25 of the pinions 23 are in contact with the similar portions 28 of the gear 26, said shafts may be turned to tilt the motors 21 as shown in Fig. 4, to assist in ascending or descending.

In the present disclosure, a pinion 32 is secured to a shaft 33 which may be rotated by any desired means such as an electric motor 34, said pinion meshing with an annular series of teeth 35 on the gear 26, so that this gear may be turned in one direction or the other. For connecting this gear 26 with the turntable 14 to turn the latter, I have illustrated a vertically shiftable clutch member 36 surrounding the trunnion 12 and having teeth 37 at its upper end for engagement with similar teeth at the lower side of said turntable. The periphery of the clutch member 36 is provided with a continuous groove 38 receiving studs 39 on a U-shaped yoke 40, said yoke being secured to a rock shaft 41. This rock shaft is provided with a hand lever 42 or with other suitable means whereby it may be turned to either engage the clutch member 36 with the turntable 14 or to disengage said clutch member from said turntable. The clutch member is slidably keyed or splined to the gear 26 as indicated at 43.

For holding the turntable 14 against further movement after turning thereof, a locking rod 44 is shown engageable with any of a plurality of sockets in the periphery of the trunnion 12, one of said sockets being illustrated at 45 in Fig. 1.

Substantially three-quarters of the circumference of the turntable unit above described, projects through a slot 46 in the cabin 8 while the remainder of said unit is then within a portion of said cabin which I term a mechanical room. When four motors are employed as in the present showing, three of these motors will normally be at the exterior of the cabin as shown in Fig. 2, whereas the fourth will be within the cabin in position to receive attention. The opposed sides of this cabin are provided with doorways 47 through which the motors and propellers may move when the turntable is rotated, and sliding doors 48 may be employed to normally close said doorways 47. Also, the turntable 14 may be provided with an upstanding flange 49 which substantially closes at least the upper portion of the slot 46 to prevent inrush of air.

Assuming that the motors at the exterior of the cabin have been operating for a long period of time and one of them requires attention, it is an easy matter to bring this motor into the cabin to receive such attention. When this is to be done, clutch member 36 is engaged with the turntable 14 as shown in Fig. 1, the locking rod 44 is released from the socket 45, and the motor 34 is driven. This causes the pinion 32 and the gear teeth 35 to drive the gear 26 and the latter, through the instrumentality of the clutch member 36 drives the turntable 14 to the required extent. When this extent has been reached, clutch member 36 is disengaged from the turntable 14 and the latter is again locked by projection of the rod 44 into a socket 45. The gear 26 may now be further rotated to cause its toothed portions 27 to co-act with the similar portions 24 of the pinions 23, thereby allowing the motors 20 and the propellers 21 to be turned upon the shafts 18 to cause said propellers to operate in the desired planes, either at right angles to the length of the craft or somewhat oblique to such length if it be necessary to combat lateral winds.

Normally, tooth-free portions of the pinions 23 contact with similar portions of the gear 26 as shown in Fig. 3. Hence, at any time, the motors and propellers may be tilted as indicated in Fig. 4, by operating the means 31, to assist in ascending or descending.

Attention is invited to the fact that the present disclosure is for illustrative purposes. Moreover, while only one unit of the invention has been illustrated, it is to be understood that a plurality of such units may be employed at any desired locations, and whenever making an adjustment of one unit, it is preferable to stop the motors thereof, the motors of the other unit or units however, then continuing to operate so that there will be no appreciable effect on the speed of the craft.

I claim:—

1. In an aircraft having a windshield, a plurality of propeller-driving motors, part of said plurality being disposed externally of said shield for craft-propulsion and the remainder of said plurality being disposed at the inner side of said shield in position to receive attention, individual supports carrying said motors, master supporting means upon which said individual supports are mounted on vertical axes, means for moving said master supporting means to move at least one of said motors from the exterior of said shield to the inner side of the latter and to simultaneously move another of said motors from said inner side of the shield to said exterior thereof, and means for turning said individual supports about their vertical axes to properly set the active motors for craft-propulsion after moving said master supporting means.

2. A structure as specified in claim 1; together with means embodied in said master supporting means for moving said individual supports about horizontal axes when desired.

3. In an aircraft having a windshield, a turntable disposed partly at the exterior and partly at the inner side of said shield, a plurality of individual motor supports spaced apart circumferentially of said turntable, means mounting said supports on said turntable upon vertical axes, a plurality of propeller-driving motors mounted on said supports, part of said plurality of motors being disposed externally of said shield and the remainder of said plurality of motors being disposed at the inner side of said shield in position to receive attention, means for turning said turntable to move at least one of said motors from the exterior of said shield to the inner side of the latter and to simultaneously move another of said motors from said inner side of the shield to said exterior thereof, and means whereby said supports may be turned about their vertical axes to properly set the active motors after turning of said turntable.

4. In an aircraft, a turntable, rock shafts mounted on and extending diametrically of said turntable, individual motor supports mounted on the ends of said rock shafts upon vertical axes, a plurality of propeller-driving motors mounted on said supports, means for turning said turntable to dispose part of said plurality of motors at craft-propulsion position and the remainder of said plurality in position to receive attention, means for turning said supports about their vertical axes, and means for turning said rock shafts.

5. In an aircraft, a turntable, a plurality of motor supports spaced apart circumferentially of said turntable and mounted upon the latter on vertical axes, said supports having pinions concentric with their axes, a gear co-axial with said turntable and engaging said pinions, means for driving said turntable and said gear, and means for locking said turntable.

6. In an aircraft, a turntable, a plurality of motor supports spaced apart circumferentially of said turntable and mounted upon the latter on vertical axes, said supports having pinions concentric with their axes, a gear co-axial with said turntable and engaging said pinions, releasable means for either connecting said gear and turntable for rotation in unison or for disconnecting them, releasable means for locking said turntable, and means for driving said gear when said turntable and gear are connected or when said turntable and gear are disconnected and the former locked.

7. In an aircraft, a turntable, bearings spaced apart circumferentially of said turntable and mounted thereon on axes extending radially thereof, a plurality of motor supports carried by said bearings and mounted on vertical axes, said motor supports each having a pinion co-axial therewith and formed with alternate toothed and tooth-free portions, a gear co-axial with said turntable and having alternate toothed and tooth-free portions for engagement with the corresponding portions of said pinions, means for turning said turntable and said gear, means for locking said turntable, and means for turning said bearings about said radial axes thereof when the tooth-free portions of said pinions are in contact with the corresponding portions of said gear.

8. In an aircraft having a windshield, a motor positioned at the outer side of said shield for craft propulsion, a second motor positioned at the inner side of said shield to receive attention, and means for simultaneously moving the two motors on different paths and spotting each at the position previously occupied by the other.

9. In an aircraft having an enclosure, a propeller-driving motor at the exterior of said enclosure, a second propeller-driving motor within said enclosure, and means for simultaneously moving the two motors on different paths and spotting each at the position previously occupied by the other.

10. In an aircraft having a windshield, a motor positioned at the outer side of said shield for craft propulsion, a second motor positioned at the inner side of said shield to receive attention, and a movably mounted carrier for the two motors operable to simultaneously move said motors on different paths and spot each at the position previously occupied by the other.

11. In an aircraft having a windshield, a motor positioned at the outer side of said shield for craft propulsion, a second motor positioned at the inner side of said shield to receive attention, and a turntable upon which said motors are mounted, whereby their positions may be interchanged at will.

12. In an aircraft having an enclosure, a propeller driving motor at the exterior of said enclosure, a second propeller driving motor within said enclosure, and a turntable upon which said motors are mounted whereby their positions may be interchanged at will.

13. In an aircraft having a windshield, a plurality of propeller-driving motors, part of said plurality being disposed externally of said shield at craft-propulsion position and the remainder of said plurality being disposed at the inner side of said shield in position to receive attention, and means under a single control for simultaneously shifting the positions of said motors with respect to said shield to retract at least one motor to the inner side of the shield and to project at least one other motor to the exterior of the shield.

14. In an aircraft having a windshield, a plurality of propeller-driving motors, and a turntable upon which said motors are mounted, said turntable projecting beyond opposite sides of said shield, whereby part of said plurality of motors may be positioned at the exterior of said shield for craft propulsion and the remainder at the inner side of said shield in position to receive attention.

15. In an aircraft having an enclosure, a turntable mounted to extend partially into said enclosure and partially to the exterior thereof, and a plurality of propeller-driving motors mounted on said turntable, whereby part of said plurality may be disposed at the exterior of the enclosure for craft propulsion and the remainder disposed within said enclosure.

16. In an aircraft having a windshield, a plurality of propeller-driving motors, part of said plurality being disposed externally of said shield at craft-propulsion position, and the remainder of said plurality being disposed at the inner side of said shield in position to receive attention, and means mounting said motors and connecting them for simultaneous movement, whereby said motors may be shifted to retract at least one motor to the inner side of the shield and to simultaneously project at least one other motor to the exterior of said shield.

In testimony whereof I affix my signature.

LOUIS ALEXANDRE CADORET.